United States Patent
Li et al.

(10) Patent No.: US 12,461,277 B2
(45) Date of Patent: Nov. 4, 2025

(54) ELECTRICALLY-CONTROLLED DYNAMIC OPTICAL COMPONENT COMPRISING A METASURFACE

(71) Applicant: MAX-PLANCK-GESELLSCHAFT ZUR FÖRDERUNG DER WISSENSCHAFTEN E.V., Munich (DE)

(72) Inventors: Jianxiong Li, Tianjin (CN); Robin Kaissner, Stuttgart (DE); Laura Na Liu, Stuttgart (DE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 227 days.

(21) Appl. No.: 18/258,108

(22) PCT Filed: Nov. 26, 2021

(86) PCT No.: PCT/EP2021/083191
§ 371 (c)(1),
(2) Date: Jun. 16, 2023

(87) PCT Pub. No.: WO2022/128410
PCT Pub. Date: Jun. 23, 2022

(65) Prior Publication Data
US 2024/0053510 A1    Feb. 15, 2024

(30) Foreign Application Priority Data

Dec. 18, 2020 (EP) .................................... 20000477

(51) Int. Cl.
*G02B 1/00* (2006.01)
*G02B 26/02* (2006.01)
*G02F 1/15* (2019.01)

(52) U.S. Cl.
CPC ............. *G02B 1/002* (2013.01); *G02B 26/02* (2013.01); *G02F 1/15* (2013.01); *G02F 2202/30* (2013.01)

(58) Field of Classification Search
CPC .......... G02B 1/002; G02B 26/02; G02B 5/32; G02F 1/15; G02F 1/19; G02F 1/31;
(Continued)

(56) References Cited

U.S. PATENT DOCUMENTS 10,665,953 B1   5/2020   Akselrod et al.
2001/0033400 A1   10/2001   Sutherland et al.
(Continued)

FOREIGN PATENT DOCUMENTS

WO   WO 2013033591 A1   3/2013

OTHER PUBLICATIONS

Chen, Hou-Tong, Antoinette J. Taylor, and Nanfang Yu. "A review of metasurfaces: physics and applications." Reports on progress in physics 79.7 (2016): 076401.
(Continued)

*Primary Examiner* — Sonya M Sengupta
(74) *Attorney, Agent, or Firm* — LEYDIG, VOIT & MAYER, LTD.

(57) ABSTRACT

An optical component (1) comprising a planar metasurface (2) arranged on a surface of a first substrate (3) and a top layer (4) arranged in a height direction Z above the metasurface (2), wherein the metasurface (2) comprises an array (9) of scattering structures (5, 5a, 5b), wherein the array (9) is a repeating pattern of unit cells (7), wherein a unit cell (7) comprises at least two different scattering structures wherein the optical properties of the metasurface (2) are controllable by a control signal, wherein first scattering structures (5, 5a) are at least partially contacting a layer of a first substance (6a) having a first refractive index and second scattering
(Continued)

structures (5, 5*b*) are at least partially contacting a layer of a second substance (6*b*), which differs from the first substance (6*a*) and which provides a variable refractive index depending on the control signal.

20 Claims, 4 Drawing Sheets

(58) Field of Classification Search
CPC ............ G02F 2202/30; G02F 2202/36; G03H 1/2294; G03H 2001/0439; G03H 2240/26
See application file for complete search history.

(56) References Cited

U.S. PATENT DOCUMENTS

| | | |
|---|---|---|
| 2018/0240653 A1 | 8/2018 | Akselrod et al. |
| 2018/0241131 A1 | 8/2018 | Akselrod |
| 2018/0321518 A1 | 11/2018 | Atwater |
| 2019/0301025 A1 | 10/2019 | Akselrod et al. |
| 2020/0371215 A1 | 11/2020 | Jain et al. |
| 2024/0053510 A1* | 2/2024 | Li .................... G02B 26/02 |

OTHER PUBLICATIONS

Extended European Search Report, mailed Nov. 16, 2021 in European Patent Application No. 21172284.8.
Hsiao et al. (2016) "Electrically active nanoantenna array enabled by varying the molecular orientation of an interfaced liquid crystal," RSCAdv.. 6, 87, 84500-84504.
International Preliminary Report on Patentability, dated Oct. 24, 2023, corresponding to International Application No. PCT/EP2022/058480, (from which the present application claims priority,) 9 pp.
International Search Report and Written Opinion, mailed Mar. 14, 2022 in International Patent Application No. PCT/EP2021/083191.
International Search Report, mailed Jul. 20, 2022 in International Patent Application No. PCT/EP2022/058480.
Staude, Isabelle, and Jörg Schilling. "Metamaterial-inspired silicon nanophotonics." Nature Photonics 11.5 (2017): 274-284.
Office Action issued in corresponding CN application No. 2021800858218, dated Aug. 2, 2025.

* cited by examiner

ELECTRICALLY-CONTROLLED DYNAMIC OPTICAL COMPONENT COMPRISING A METASURFACE

CROSS-REFERENCE TO RELATED APPLICATIONS

This application is a U.S. National Stage Application filed under 35 U.S.C. § 371 of International Application No. PCT/EP2021/083191, filed Nov. 26, 2021, which claims the benefit of European Application No. EP 20000477.8, filed Dec. 18, 2020. Both of these applications are hereby incorporated by reference in their entireties.

The invention relates to an optical component comprising a metasurface comprising a surface of a first substrate and a top layer arranged in a height direction Z above the metasurface.

The propagation of a beam of light, or electromagnetic radiation, can be determined completely by its phase and amplitude profiles at a given two-dimensional surface. In order to manipulate such optical beams, optical devices or optical components are used. Although a manipulation of the amplitude and the phase may be considered typical, a manipulation of the phase is preferred in order to avoid undesired losses. The propagation of the optical beams is manipulated by inducing upon them a specific phase profile. Such optical devices may be lenses, prisms, mirrors, or holographic elements. Such a manipulation may be realized by thickness variations of the optical devices.

Optical metasurfaces have been found to be suitable for substituting conventional optics in many optical systems. Metasurfaces are (mostly planar) structures which can modulate the local properties of an optical beam. Typically, a metasurface is an artificial nanostructured interface that manipulates light by spatially arranged meta-atoms. These meta-atoms usually consist of plasmonic or dielectric nano-antennas, which can directly change light properties such as phase, amplitude, and polarization.

Conventional optics manipulate light only by refraction and propagation. Optical metasurfaces are sub-wavelength patterned layers that interact strongly with light, altering the light properties over a subwavelength thickness by scattering from small nanostructures. Thus, optical metasurfaces offer a fundamentally new method of light manipulation, including spectral selectivity, wavefront and polarization control. Furthermore, optical systems comprising optical metasurfaces could be much smaller compared to conventional optics. Metasurfaces provide a high resolution control over the phase profile of the optical beam. In particular, for holographic applications and beam shaping metasurfaces are advantageous.

The manipulation of light is caused by nanostructures which resonantly capture the light and re-emit it with a defined phase, polarization, modality and spectrum. This allows sculpting of light waves with unprecedented accuracy. OMs have some similarities to frequency selective surfaces and high-contrast gratings. However, they have experienced enormous advances in their complexity and functionalities over the past decade.

From US 2018/0321518 A1 an electrically tunable metasurface is known. It comprises a mirrored surface, a conductive layer, and a dielectric layer. The conductive layer and the dielectric layer are in direct contact and are thereby defining a conductor-dielectric interface. A plurality of sub-wavelength antenna elements is arranged on the dielectric layer and configured to establish a potential difference between the subwavelength antenna elements and the mirrored surface. In conjunction with the geometry and the material composition of each of the subwavelength antenna elements, the conductive layer, and the dielectric layer, the propagation characteristics of incident electromagnetic waves is tunable by the electrically tunable metasurface.

A drawback of optical metasurfaces known in the prior art is that their optical properties are fixed or their optical reconfigurability is strongly limited. Improved optical reconfigurability is desired, since it allows control of certain properties and functionalities of the optical metasurfaces.

The object of the invention is to provide an optical component and an optical device, which overcomes the above-mentioned disadvantages. Integration of such an optical component in an optical device is desired. Furthermore, a method for producing of such an optical component should be provided.

The problem is solved by the optical component according to claim 1 as well as a method according to claim 15. The further dependent claims provide preferred embodiments.

According to the invention an optical component comprises a (preferably planar) metasurface arranged on a surface of a first substrate and a top layer arranged in a height direction above the metasurface. The metasurface comprises an array of scattering structures. The array is a repeating pattern of unit cells, wherein a unit cell comprises at least two different scattering structures. The optical properties of the metasurface are controllable by a control signal, wherein first scattering structures are at least partially contacting a layer of a first substance having a first refractive index and second scattering structures are at least partially contacting a layer of a second substance, which differs from the first substance and which provides a variable refractive index depending on the control signal. Thus, the refractive index of the second substance could be selectively amended by the control signal. Since the second substance differs from the first substance, the refractive index in each cell differs locally between areas in which first scattering structures are present and those in which second scattering structures are located.

Preferably the second substance comprises a polymer. It has been found that changes of the conformation of polymers are especially suitable for amending the refractive index of such a substance. Preferably the second substance comprises a conducting and/or electrochromic polymer, since these polymers provide a big difference of the refractive index in different states. Preferably the polymer is switchable between an oxidized and a reduced state. Often an oxidized and a reduced state of polymers provide big differences of the refractive index. Furthermore, it is preferred that the polymer is electrochemically switchable between an oxidized and a reduced state. In contrast to other techniques, electrochemically switching has been found to be extremely fast. Preferably the polymer comprises conjugated double bonds and/or conjugated p-orbitals, since an applied charge could be transported along the conjugated system and thus stabilized. Especially preferred are polymers comprising a plurality of aromatic rings, which stabilize charges even better. Polyaniline (substituted or preferably non-substituted) has been found to be especially suitable due to its high stability, low cost, worldwide availability and facile synthesis.

Preferably, the first and second scattering structures generate a propagation phase difference if the incoming radiation. It is advantageous that each unit cell comprising two scattering structures is addressable by the control signal.

In a preferred embodiment, the scattering structures comprise a metal. Metals have been found especially suitable, since metals could serve as antennas for the control signal. To avoid oxidation of the metal, noble metals are preferred. Thus, the metal is preferably selected from a group comprising ruthenium, rhodium, palladium, silver, osmium, iridium, platinum, rhenium, copper and gold. The scattering structures preferably mainly consist of one or more of these metals. "Consist of" should be understood as one or more of these metals of at least technical grade purity is the only component of these structures. Impurities are tolerated but no further substances are added. However, it is often desired that the properties of the scattering structures are more or less identical. This could be achieved in a preferred embodiment, in which the scattering structures comprise at least 95%, preferably ≥98%, more preferably ≥99%, most preferably ≥99.5% of one of these metals. Most preferably the scattering structures comprise at least 95%, preferably ≥98%, more preferably ≥99%, most preferably ≥99.5% of gold. Gold has been fond advantageous, since it is extremely resistant against oxidation, provides very good electrical conductivity and techniques for producing nanoscaled structures, e.g. by electron-beam lithography (EBL), are known.

Advantageously the scattering structures are deployed as optical antennas. Preferably, when the electromagnetic radiation strikes an individual scattering structure, it causes the charge present in the scattering structure to oscillate. This is called a surface plasmon. The interaction of the impinging electromagnetic radiation and the surface plasmon leads to a phase discontinuity. The electromagnetic radiation, which is transmitted through or reflected from the optical component undergoes therefore a phase jump.

In a preferred embodiment, the scattering structures are deployed as optical antennas. Preferably in the form of rods. As "rods" objects of cylindrical or cuboid geometry should be understood, which provide an extension along their longitudinal direction, which is at least 1.2 fold, preferably ≥1.5 fold, more preferably ≥2 fold longer than any extension along a with direction which is perpendicular to the longitudinal direction. It has been found that those rods are especially suitable antennas. Preferably the rods are orientated in the plane of the metasurface, more preferably in spatially varying orientations. In such an orientation the antennas are most effective.

Preferably, the geometry and size of the first and/or second scattering structures in an array is substantially the same. As "substantially the same should be understood that a geometry and size of the first and/or second scattering structures in an array differs by ≤5%, preferably ≤3% and more preferably ≤1%. Most preferably the geometry and size of the first and/or second scattering structures in an array is the same. This could be achieved by techniques, e.g. electron-beam lithography, which enables manipulation of the shape on an atomic level. The geometry and size of the first and second scattering structures could be different. However, it is preferred that all first scattering structures provide substantially the same geometry and size and all second scattering structures provide substantially the same geometry and size. Most preferably, geometry and size of all the (first and second) scattering structures in an array is substantially the same.

In a preferred embodiment, the first and/or second scattering structures provide a cylindrical or cuboid geometry ("rod"), preferably a geometry of a right circular cylinder or a rectangular cuboid. The longitudinal extension of each scattering structure is preferably in the range of 100-400 nm, preferably 150-300 nm, more preferably 175-225 nm, most preferably about 200 nm. In a width direction, which extends perpendicular to the longitudinal direction, an extension in the range of 10-200 nm, preferably 20-150 nm, more preferably 30-100 nm, most preferably 50-80 nm has been found advantageous. In case of a (right) circular cylinder, the width direction is the diameter of the cylinder. For irregular cylinders or cuboids, the extension along two width directions perpendicular with respect to each could be independently selected from these preferred ranges. For square cuboids these two width directions could be identical.

Preferably, the dimensions of the scattering structures are smaller than the wavelength A of an incident electromagnetic radiation to be manipulated by the optical component. Small dimensions of the scattering structures provide higher resolution of the optical component.

Also, the spacing between the scattering structures has an effect on the resolution. To provide a high resolution, the spacing between the scattering structures is preferably smaller than half of the wavelength A of the incident electromagnetic radiation to be manipulated by the optical component.

Preferably the optical properties of the metasurface switchable from a first optical property to a second optical property in less than 500 ms, preferably ≤250 ms, preferably ≤100 ms, more preferably ≤50 ms, most preferably ≤35 ms. Fast switching between two different optical properties has been found advantageous for a plurality of applications.

Preferably, a volume above the metasurface is filled with a defined (inert) medium, to avoid undesired chemical reactions. In general, there is no limit with respect to the volume arranged between the first substrate and the top layer. However, it has been found that—especially in case the top layer serves as an electrode—the best performance is achieved if the top layer is not too close with respect to the metasurface. Preferably, a height of a volume between the first substrate and the top layer is at least 3×, preferably ≥5×, more preferably ≥10×, more preferably ≥20×, most preferably ≥50× the height of the scattering structures. Preferably, the height of the volume between the first substrate and the top layer is smaller than 500×, preferably ≤200×, more preferably ≤100×, more preferably ≤75×, most preferably ≤50× the height of the scattering structures. A medium, preferably a liquid medium is arranged in this volume. Preferably this medium is a conducting medium, most preferably an ionic solution. Such a medium not only protects the metasurface, but also provides electrical conductivity in case the top layer serves as an electrode.

In a preferred embodiment, the first substance comprises a dielectric material, preferably a dielectric polymer. More preferably this polymer is an acrylate polymer, most preferably polymethyl methacrylate (PMMA). Polymethyl methacrylate is preferred since its refractive index ($n_1+ik_1$) in the visible wavelength regime is n1=1.5 and k1≈0. Preferably the refractive index of the first substance does not change significantly with the control signal. This means that the refractive index of the first substance does not change of more than 10%, preferably ≤5%, more preferably ≤2% after application of the control signal. Preferably the refractive index of the first substance does not change significantly within a temperature range of 0-40° C. This means that the refractive index of the first substance does not change of more than 10%, preferably ≤5%, more preferably ≤2% in this temperature range.

Preferably the first substance is at least partially enclosing the first scattering structures, more preferably contacting the first scattering structures at all sides which are not contacting the first substrate. Thus, the first scattering structures are preferably enclosed by the first substrate on one side and the first substance at all other sides.

It is preferred that the real part n and/or the imaginary part κ of the variable refractive index ($n_2+ik_2$) of the second substance is shiftable by the control signal to the respective value of the first substance. As described below, it is advantageous if the shiftable refractive index of second substance could be tuned to the same value as the refractive index of the first substance (e.g. $n_1$=1.6 for PMMA). When the refractive index of second substance is tuned to have almost no absorption ($k_2 \approx 0$), the anomalous transmission becomes very weak. When $n_2$ reaches the value of $n_1$ (=1.5), the light intensity approaches zero since the refractive indices are equivalent to that of a metasurface homogeneously covered by only PMMA.

In a preferred embodiment, the geometry of the first and/or second scattering structures is that of a cylinder or a parallelepiped. It has been found that these structures are easy to produce and provide sufficient optical performance. However, geometries providing less degrees of freedom, like a right circular cylinder or a rectangular cuboid, are preferred. Preferably a longitudinal extension of the first and/or second scattering structures is preferably in the range of 100-400 nm, preferably 150-300 nm, more preferably 175-225 nm, most preferably about 200 nm. This longitudinal extension provides suitable optical effects for a wide range of wavelengths including that of visible light. Preferably the first and/or second scattering structures have a width (which should be understood to be the extension along a direction perpendicular to the longitudinal direction) in the range of 10-200 nm, preferably 20-150 nm, more preferably 30-100 nm, most preferably 50-80 nm. This width also provides good optical properties and are easily to handle with common techniques. Most Preferably two width extensions of a cuboid or irregular cylindrical could be independently selected from these preferred ranges. It should be understood that small deviations from the above-mentioned ideal geometries like rounded edges or corners should be encompassed by this wording.

As mentioned above, the first scattering structures and the second scattering structures are arranged in an array providing a repeating pattern of unit cells. In a preferred embodiment, each unit cell comprises a line of first scattering structures and a line of the second scattering structures. Preferably, neighboring unit cells are arranged with respect to each other in such a way that the first and second scattering structures are forming in alternating lines in the array. Thus, preferably the first and second scattering structures are arranged in alternating lines in the array. This arrangement provides an even distribution of the different scattering structures. Furthermore, the first and second scattering structures could be easily covered with different first and second substances.

Preferably each unit cell (13) is addressable independently by the control signal. This means that each unit cell could be switched by the control signal from a first state, which provides first optical properties to a second state, which provides different optical properties, independently from the state of neighboring cells. Preferably neither the state of neighboring cells has an influence on the switchability of a cell to be switched, nor does a neighboring cell switch its state when the state of the cell to be switched changes.

In a preferred embodiment, the first substrate comprises a carrier. This is advantageous since such a carrier could support the different scattering structures. It has been found advantageous that the carrier comprises silica, preferably quartz. The chemical properties (especially electrochemical properties) of silica, especially quartz, could be easily adapted to specific needs. In a particularly preferred embodiment, the carrier consists of quartz, which is coated with a conductive coating. As mentioned above with respect to the material of the scattering structures "consists" should be understood in such a way, that impurities up to a certain degree are tolerated. The coating preferably is a metal containing. Many metals could be easily applied as thin layer on the quartz surface by desorption from the gaseous phase. A coating comprising or preferably consisting of an indium tin oxide has been found to be especially suitable.

A further aspect of the present invention is an optical device comprising an optical component as described above. Application of an electric field could cause a modulation of an optical functionality of such an optical device due to a modulated phase profile of an incident electromagnetic radiation, which is transmitted through or reflected by the optical component. Such an optical device could be extremely thin with respect to those comprising conventional optical components like conventional (glass) lenses. Furthermore, a modulation of the phase profile could be easily be triggered by a control signal.

Preferably, the optical device is a holographic device or a lens or a beam steering device. For these applications, an optical component as described above has been found to be especially suitable because of the switchability of its optical properties and the small height.

The scattering structures are also called meta atoms or building blocks of the metasurface. Advantageously the electromagnetic radiation has a wavelength λ=10 nm to 1000 nm. Preferably the electromagnetic radiation is in the infrared spectrum from about 700 nm to about 1000 nm). Preferably the electromagnetic radiation is in the visible spectrum from about 380 nm to 740 nm.

According to a preferred embodiment the phase profile, induced on the incident electromagnetic radiation, comprises a geometric phase component. Preferably, the geometric phase component is introduced due to a (local) phase retardation of the incident electromagnetic radiation. Advantageously the (local) phase retardation depends on the orientation of the scattering structures. Such phase retardation could be based on the Pancharatnam-Berry (PB) phase principle. The spatial control of the polarization state of light inevitably introduces nontrivial spatially varying phase distributions, known as a PB phase. If two parts of a uniformly polarized wave are altered to a common polarization state along two different paths on the Poincare sphere (polarization state space), a relative phase emerges between the two polarization states which is equal to half of the solid angle enclosed by the path.

The PB phase represents the evolution of polarization conversion history, so the clockwise and anti-clockwise evolution would flip the sign of such a geometric phase. Thus, when a beam of circularly polarized (CP) light impinges upon a preferred scattering structure which is deployed as optical antenna with a preferred linearly polarized resonance (e.g. a dipole), the scattered beam is partially converted into the opposite helicity with a phase shift which is determined solely by the geometrical orientation of the antenna. Close to normal incident angles, a CP beam is primarily scattered into beams with identical polarization without phase change and to beams with the opposite circular polarization with a phase change corresponding to twice the angle formed between the dipole and a reference axis. Preferably, the normal incident axis is arbitrary. The sign of the phase shift depends on the helicity state of the impinging beam (either right- or left-handed helicity). On the other hand, the amplitude of the scattered field is preferably independent of the orientation of the scattering structure but rather on its frequency response. Advantageously the phase retardation depends exclusively on the orientation of the scattering structure.

Metasurfaces that shape light wavefronts via geometric phase, e.g., Pancharatnam-Berry (PB) phase can preferably be realized by controlling the in-plane orientations of optical antennas. This approach not only allows highly precise control of the phase profile, but also alleviates the fabrication complexity. Importantly, the PB phase does not depend on the specific antenna design or wavelength, rendering broadband performance possible.

An advantageous selective combination of the geometric phase component and a propagation phase component on individual subwavelength pixels achieves a pixel-level addressability. This concept is universal and works for any active materials, which exhibit refractive index changes upon electrical, light, thermal, or other external stimuli.

Preferably, the geometric phase is unrelated to the dynamic (propagation) phase that accumulates along the optical propagation path of the electromagnetic radiation. Advantageously, the geometric phase modulation can be obtained by using anisotropic, subwavelength metallic/dielectric scattering structures with identical geometric parameters but spatially varying orientations. Preferably, the scattering structures are resonantly excited by the electromagnetic radiation. This bears the advantage of achieving a large scattering cross section. Based on the principle of PB phase, the phase delay from each nanorod is equal to 2φ, where φ is orientation angle of scattering structure. Thus, arbitrary phase profile is achieved by arranging the scattering structures with different orientations on the metasurface.

A preferred usage of the optical component is to design a hologram. This may for instance be realized by a Fourier hologram, which is designed to obtain the desired beam profile in the far field. Preferably, a required phase mask is the inverse Fourier transform of the desired image. The design of such a phase mask may require an iterative numeric approach. For optical devices with a simpler functionality such as lenses beam reflectors the pattern of the phase mask may be derived analytically. Further, the calculated phase map, which is found either numerically or analytically, is advantageously quantized. Once a quantized phase map is found, the pixels, i.e. the scattering structures, are deposited with an orientation/a dielectric pillar according to the required local phase shift.

The optical device may comprise one or more optical components, each comprising a single feature or combinations of the features described above. The same advantages may apply for the optical device as described above for the optical component and vice versa.

Preferably, the optical device is a holographic device or a lens or a beam steering device.

With proper phase-profile designs, completely interchangeable functionalities, for instance, switching between different holographic patterns within a hologram, or multifunction switching among beam steering, focusing, holography, optical vortices, etc., can be successfully implemented within milliseconds and with excellent reversibility under electrical control at visible frequencies.

The optical device and the optical component feature great potentials to achieve diversified optical functions, while keeping individual functions highly independent within a single nanophotonic device. This will lead to novel optical communication systems using ultra-thin devices with high spatial resolution, which might be very important for modern cryptography and security applications. Such highly integrated nanophotonic metasurfaces will allow for manipulation of light propagation at an unprecedented level, paving the avenue towards compact and multi-tasking optical devices.

A further problem is solved by a method for producing an optical component comprising a metasurface, providing optical properties which are controllable by a control signal. This method comprises the steps of
providing a first substrate (3),
providing a top layer (4),
producing an array (12) of scattering structures (5, 5a, 5b, 5c) on a surface of the first substrate (3), optionally by electron-beam lithography, and
creating a repeating pattern of unit cells (13) comprising at least two different scattering structures (5, 5a, 5b, 5c) in the array, by application of a first substance having a first refractive index on at least a part of a surface of a first fraction of the scattering structures (5, 5a, 5b, 5c) and application of a second substance having a second refractive index on at least a part of a surface of a second fraction of the scattering structures (5, 5a, 5b, 5c), wherein the second substance differs from the first substance and provides a variable refractive index depending on the control signal.

This method provides easy production of an optical component with exceptional optical properties. Furthermore, the optical properties could be switched between at least two different states. The metasurface is preferably planar.

Further advantages, aims and properties of the present invention will be described by way of the appended drawings and the following description.

In the drawings:

FIGS. 1A and B show an example of an optical component (1) according to the invention from different perspectives. As illustrated in FIG. 1A, a planar metasurface (2) is arranged between an upper surface (3a) of a first substrate (3) and a top layer (4). While the metasurface arranged directly on the upper surface (3a) of the first substrate (3), the top layer (4, not shown in FIG. 1B) is spaced apart along a height direction (h). The first substrate (3) and the top layer (4) are both conductive and serve as bottom and top electrodes (3, 4), respectively.

Figure 1A:
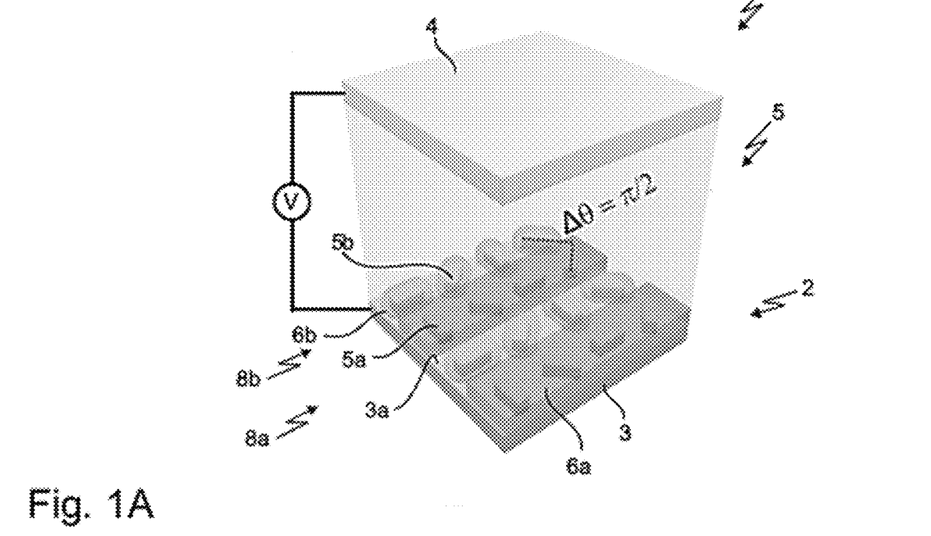
FIGS. 1A and B show an example of an optical component according to the invention from different perspectives.
Figure 1B:
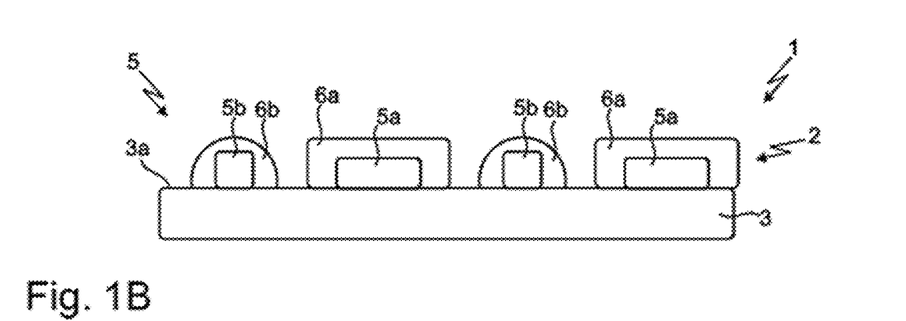

The metasurface (2) comprises a plurality of scattering structures (5, 5a, 5b). The scattering structures (5a, 5b) are arranged in lines (8a, 8b). The (first) scattering structures (5a) of some of these lines (8a) are covered with a first substance (6a) having a first refractive index, whereas the scattering structures (5b) of the other lines (8b) are covered with a second substance (6b), which differs from the first substance and which provides a variable refractive index depending on a control signal, in this example an electric potential (V) applied between the top and bottom electrodes (3, 4). In the illustrated example the first and second scattering structures (5a, 5b) are arranged in alternating lines (8a, 8b). The first substance (6a) covering the first scattering structures (5a) is a dielectric material. The second substance (6b) covering the second scattering structures (5b) is an electrochromic polymer.

The geometry of all scattering structures (5, 5a, 5b) in this example is the same, a rectangular cuboid. Since these structures are preferably made of gold, also the term "gold nanorods" is used instead of "scattering structures". It should be understood that preferred embodiments only disclosed for "gold nanorods" (5, 5a, 5b) could also be applied to "scattering structures", not comprising gold and/or having a different geometry. However, gold nanorods are preferred since they could be fabricated by electron-beam lithography (EBL) on an ITO-coated quartz substrate. The size of the gold nanorods (5, 5a, 5b) is 200 nm×80 nm×50 nm. The odd rows (or lines) (8a) are covered by PMMA ($h_1$=100 nm) through a double-layer EBL process. The gold nanorods (5, 5a, 5b) of the even rows (or lines) (8b) have been covered with PANI by electrochemical polymerization of the metasurface sample in an aqueous electrolyte containing (2 M) $HNO_3$ and (0.1 M) aniline.

The longitudinal direction of each cuboid (5) extends in the plane of the upper surface (3a) of a first substrate (3). However, the directions in this plane differs between some of the scattering structures (5, 5a, 5b). The different in-plane orientations of the scattering structures (5, 5a, 5b), which function as optical antennas, allows shaping light wavefronts via a geometric phase, e.g., Pancharatnam-Berry (PB) phase. The scattering structures are of sub-wavelength dimension and also the spacing between adjacent scattering structures (5, 5a, 5b) and/or lines (8a, 8b) of differently covered scattering structures (5, 5a, 5b) is of sub-wavelength dimension.

FIG. 1B shows a cross section of the metasurface (2) and the bottom electrode (3). The top electrode (4) is not shown. The height of all nanorods (5, 5a, 5b) is identical, however, the form of the covering first and second substance (6a, 6b) differs. While the first substance (6a) covers a line of gold nanorods (5a) and thereby forms a continuous band, the second substance (6b) only covers individual nanorods (5b), thereby forming islands of the second substance (6b). The band of the first substance (6a) has a nearly rectangular cross section. The cross section of the second substance (6a) is similar to a dome surrounding each nanorod (5a).

Figure 2A:
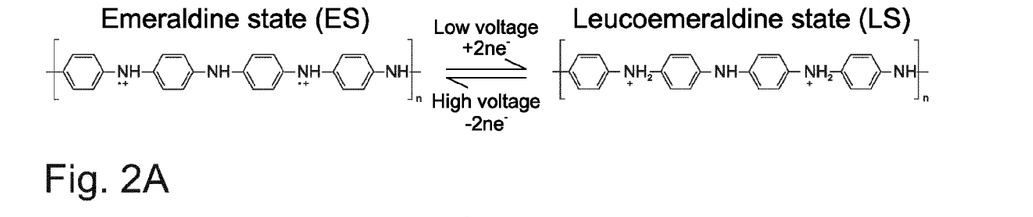
FIG. 2A shows the chemical structure of polyaniline (PANI) in its emeraldine state (ES) and its leucoemeraldine state (LS) and the electrochemical reaction for the transformation between these two states.

The optical properties of such a metasurface (2) could be controlled by applying an electrical potential (V) between the electrodes (3, 4). As a response to such an electrical potential (V), the second substance (6b) in this embodiment polyaniline (PANI) could be switched from its emeraldine state (ES) to its leucoemeraldine state (LS) and vice versa. These two states and the electrochemical reaction for the transformation in each other is illustrated in FIG. 2A.

Figure 1C:
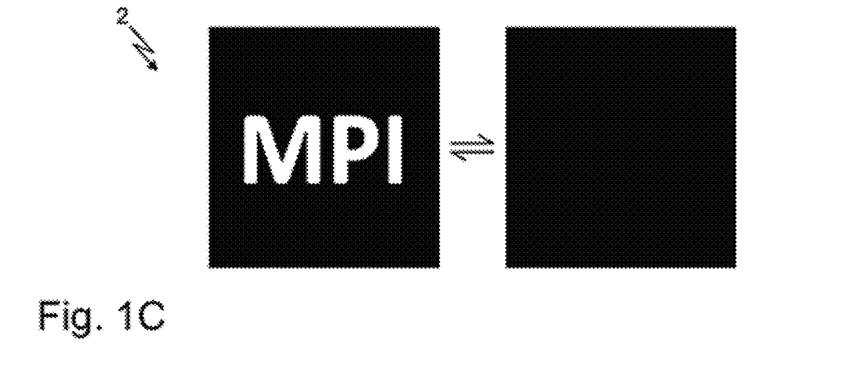
FIG. 1C schematic illustration of a holographic image comprising the letters "MPI" switched on (left) and off (right)

As a response to this switching, the optical properties of the metasurface (2) change and a holographic image, in the embodiment illustrated schematically in FIG. 10 comprising the letters "MPI", could be switched on (left) or off (right).

Figure 2B:
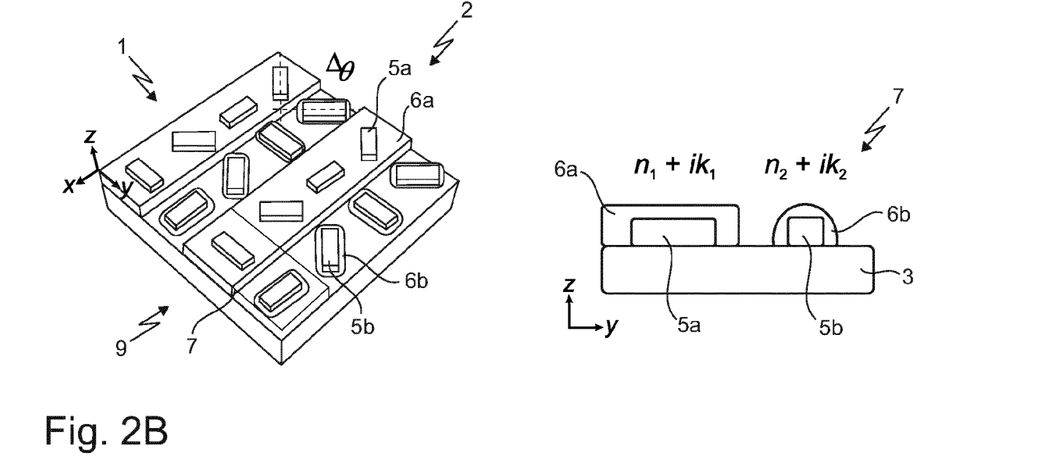
FIG. 2B an example of an optical component according to the invention from different perspectives.
Figure 2C:
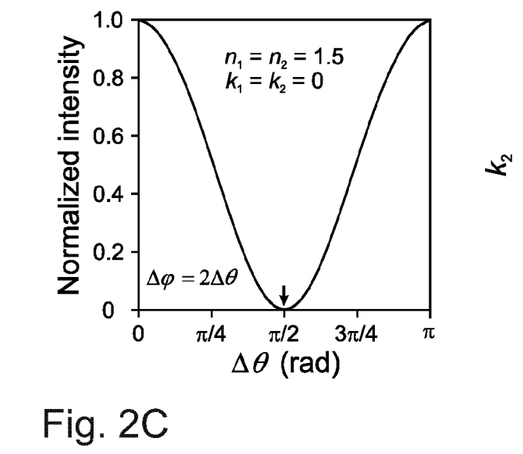
FIG. 2C illustrates amendments of the normalized intensity with respect to Δθ.

FIG. 2B again shows the optical component (1) from FIGS. 1A and B. However, the top electrode (4) is not shown. In the left illustration of FIG. 2B, a single cell (7) of the array (9) is highlighted. A cross section of such a cell (7) is illustrated on the right of FIG. 2B.

Figure 2D:
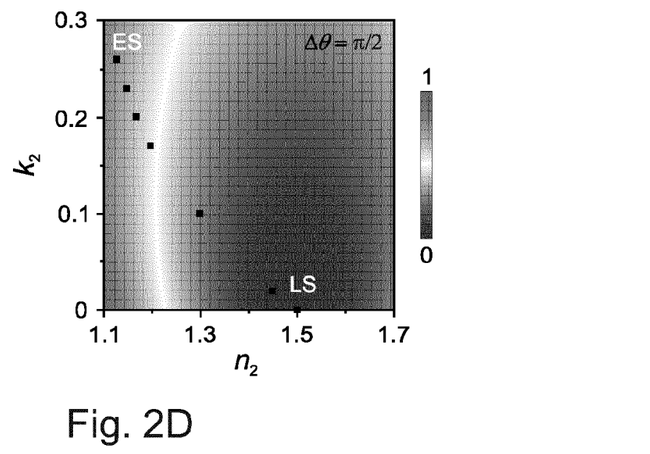
FIG. 2D illustrates amendments of the anomalous transmission as a function of the complex refractive indices $n_2$ and $k_2$.
Figure 3A:
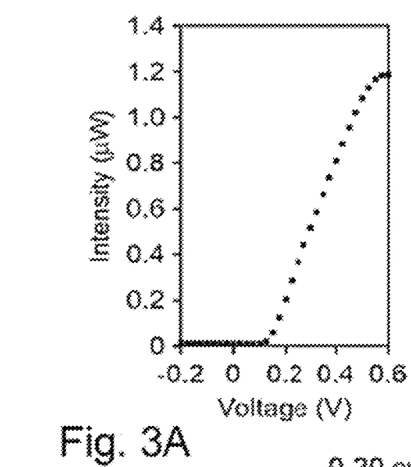
FIG. 3A illustrates amendments of light intensity as a function of the applied voltage.

The complex refractive indices ($n_2$, $k_2$) of the second substance (6b), in this embodiment PANI, at different applied voltages are different. Since the anomalous transmission of light through PANI is depending on the complex refractive indices ($n_2$, $k_2$) as illustrated in FIG. 2D, the anomalous transmission could be amended by the applied voltage (V). In case the first substance (6a) is PMMA and the first and second substance (6a, 6b) are applied in alternating lines (8a, 8b) on the scattering structure (5a, 5b, 1, 9), the light intensity increases continuously until the applied voltage (V) reaches about 0.6 V ("on") (all mentioned electrochemical potentials are measured relative to an Ag/AgCl reference electrode). This could be explained by the gradual change of the refractive index of PANI through electrochemically tuning, while the refractive index of PMMA remains constant. A minimum of the light intensity could be observed at an applied voltage (V) of about −0.2 V ("off") as illustrated in FIG. 3A.

Figure 3B:
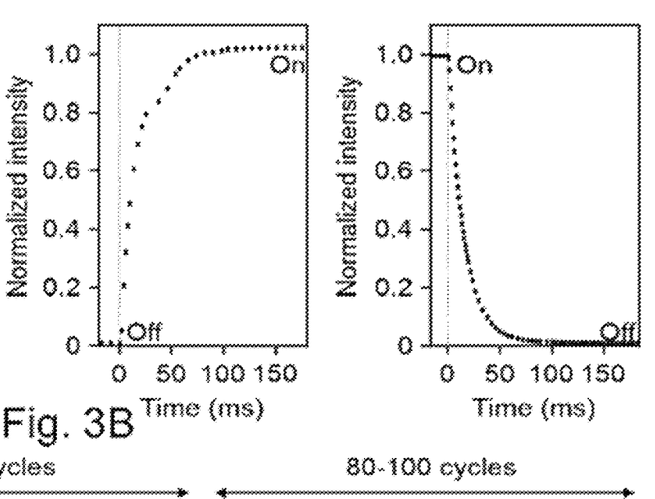
FIG. 3B illustrates the switching times for an optical component ('off→on' (left) and 'on→off' (right))
Figure 3C:
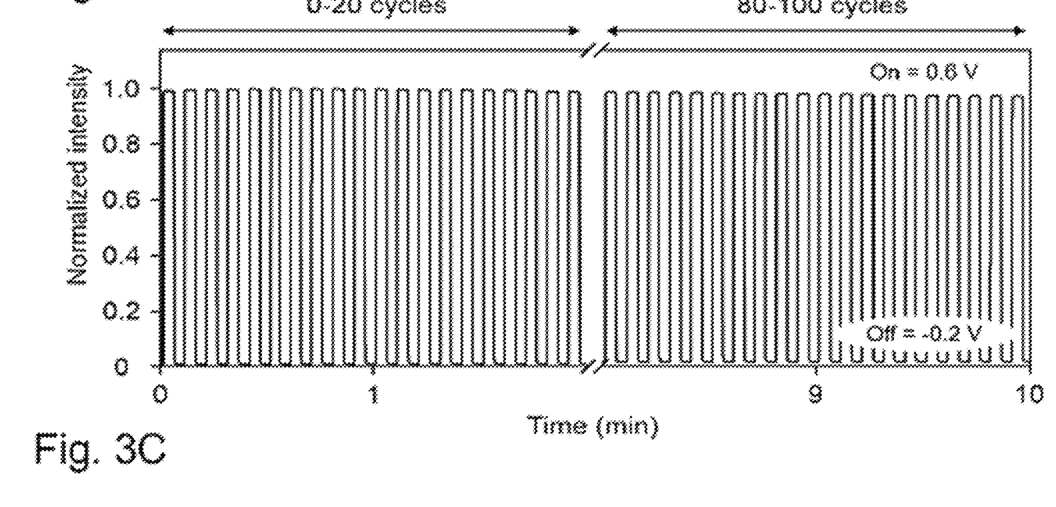
FIG. 3C illustrates nearly no degradation of the optical component over at least 100 switching cycles.

The switching times τ for rise ('off→on') and fall ('on→off') processes have been measured to be approximately 48 ms and 35 ms, respectively as shown in FIG. 3B. FIG. 3C illustrates that the switching process between the 'on' (0.6 V) and 'off' (−0.2 V) states exhibits no significant degradation over at least 100 cycles. As illustrated by FIGS. 3A-C, the tested optical component (1) provides a superior performance with respect to its switching characteristics, including rapid switching speed, high light intensity contrast, and excellent reversibility.

Responses of the metasurfaces (2) can be in situ monitored and optimized by controlling the conducting polymer thickness during its electrochemical growth. The operation of the metasurfaces (2) is electrochemically powered, showing excellent performance with high intensity contrast as high as 1000:1, fast switching rate around on the millisecond scale, and notable reversibility over 100 cycles without significant degradation.

Figure 4A:
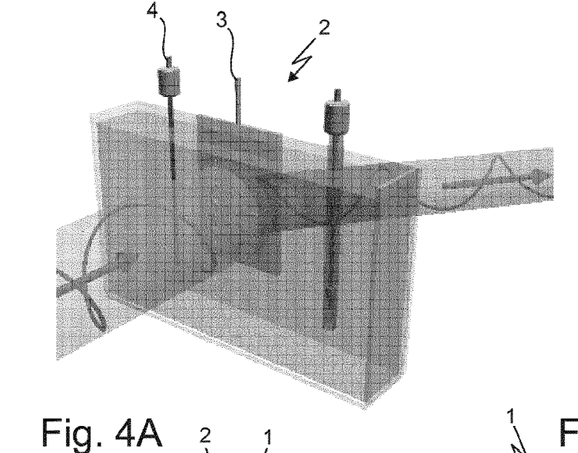
FIG. 4A shows a schematic of an experimental setup.
Figure 4B:
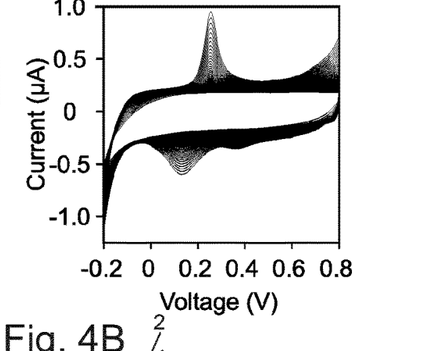
FIG. 4B shows a cyclic voltammetry diagram for the electrochemical deposition of PANI on the metasurface sample.
Figure 4C:
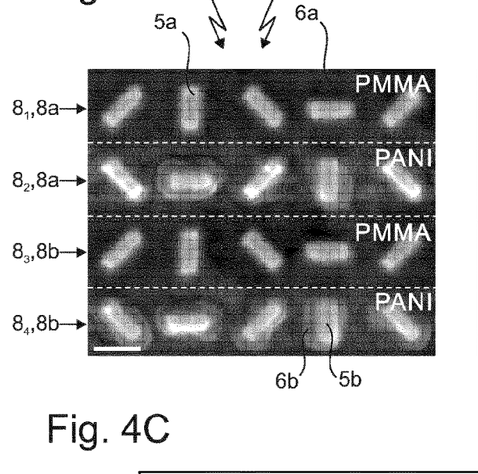
FIG. 4C shows a SEM image of the metasurface of the optical component.

FIG. 4C shows a SEM image of the metasurface (2) of the optical component (1). The illustrated rods (5, 5a, 5b) are arranged in alternating lines (8a, 8b). The rods of the first and third lines ($8_1$ and $8_3$) (from the top) are covered with PMMA, the rods of lines 2 ($8_2$) and 4 ($8_4$) are covered with PANI. The scale bar (S) at the lower left corner indicates a length of 200 nm. From FIG. 3C it could be derived, that the lines ($8_1$-$8_{2n+1}$) in which the gold rods (5, 5a, 5b) are covered with PMMA (6a) are homogeneously covered. In contrast thereto, PANI (6b) is only present in the direct surrounding of the rods ($8_2$-$8_{2n}$) of the second and forth lines ($8_2$ and $8_4$). Thus, PANI (6b) is not forming a continuous band along the lines with even numbers ($8_2$-$8_{2n}$).

Figure 4D:
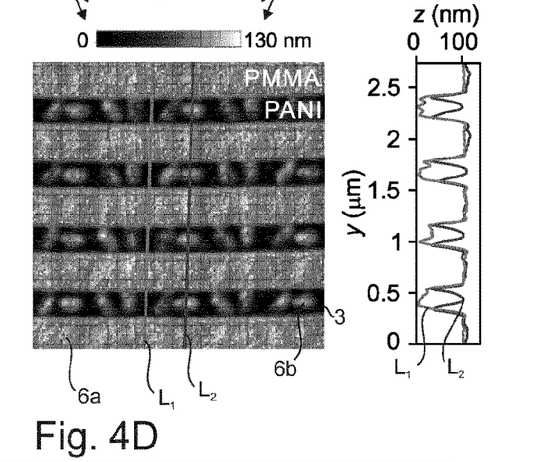
FIG. 4D shows an AFM image of the metasurface of an optical component (left) and an overly of two selected height profiles (on the right)

FIG. 4D shows an AFM image of the metasurface (2) of an optical component (left) (1). On the right, an overlay of two selected height profiles is shown. The lines along which the height profiles are measured are illustrated as lines ($L_1$, $L_2$) in the AFM image on the left. Since the height of the nanorods (5, 5a, 5b) is known to be 50 nm, the thickness of the PANI-coating (6a) on the gold nanorods (5a), $t_{PANI}$, could be determined to be approximately 50 nm. The height profiles confirm the different coverage of the gold rods (5, 5a, 5b) of the uneven numbered lines ($8_1$-$8_{2n+1}$) and the even numbered lines ($8_2$-$8_{2n}$). The height profile along the line indicated in grey (L1), which passes through the spacings between neighboring nanorods (5, 5a, 5b) of each line (8), shows a very little height along the width of the even lines ($8_2$-$8_{2n}$), whereas the height profile along the width of the uneven lines ($8_1$-$8_{2n+1}$) is about 100 nm. Thus, for both measuring lines ($L_1$, $L_2$), the height profile along the width of the uneven lines ($8_1$-$8_{2n+1}$) is similar, independently whether the lines ($L_1$, $L_2$) cross a nanorod (5a) or not. In contrast thereto, the height profile of both measuring lines ($L_1$, $L_2$) differ significantly when crossing even lines ($8_2$-$8_{2n}$), depending whether the respective line ($L_1$, $L_2$) crosses a nanorod (5b) or not.

FIG. 4B shows a cyclic voltammetry diagram for the electrochemical deposition of PANI (5b) on the metasurface sample (1). A potential range from −0.2 V to 0.8 V and a scan speed of 25 mV/s has been used.

FIG. 4A shows a schematic of an experimental setup. The metasurface (2) on ITO (working electrode 3) is immersed into an electrolyte in a glass cell along with a Pt wire (counter electrode 4) and an Ag/AgCl reference electrode. Right-handed circularly polarized (RCP) light impinges on the sample at normal incidence and the intensity of the anomalous transmission is recorded.

Figure 4E:
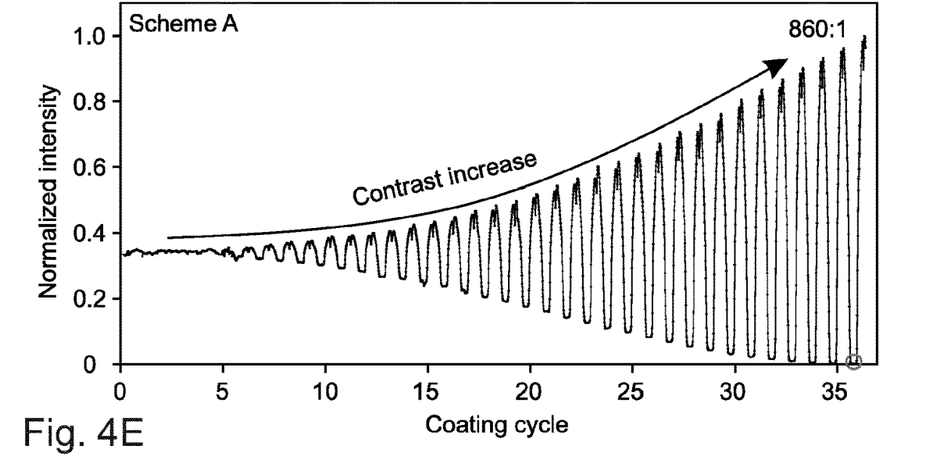
FIG. 4E shows the in situ recorded normalized intensity of the anomalous transmission during the PANI growth.

FIG. 4E shows the in situ recorded normalized intensity of the anomalous transmission during the PANI (6b) growth. The electrochemical process is halted, when the intensity reaches the minimum (cycle 36, circle). The intensity contrast, defined as the ratio between the maximum and minimum intensities, is as high as 860:1.

This invention features great potentials to achieve diversified optical functions, such as optical switch for communication systems and dynamic holographic for data storage.

All the features disclosed in the application documents are claimed as being essential to the invention if, individually or in combination, they are novel over the prior art.

The invention claimed is:

1. An optical component comprising a planar metasurface arranged on a surface of a first substrate and a top layer arranged in a height direction Z above the metasurface, wherein the metasurface comprises an array of scattering structures comprising a metal, wherein the array is a repeating pattern of unit cells, wherein a unit cell comprises at least two different scattering structures, Wherein the optical properties of the metasurface are controllable by a control signal, wherein first scattering structures are at least partially contacting a layer of a first substance comprising a dielectric material and having a first refractive index and second scattering structures are at least partially contacting a layer of a second substance comprising a polymer, which differs from the first substance and which provides a variable refractive index depending on the control signal, wherein the real part n and/or the imaginary part K of the variable refractive index of the second substance is shiftable by the control signal to the respective value of the first substance.

2. The optical component according to claim 1, wherein the second substance comprises a conducting and/or electrochromic polymer, which is switchable between an oxidized and a reduced state.

3. The optical component according to claim 1, wherein the metal of the scattering structures is selected from a group comprising ruthenium, rhodium, palladium, silver, osmium, iridium, platinum, rhenium, copper and gold.

4. The optical component according to claim 1, wherein the scattering structures comprise at least 95% of one of these metals.

5. The optical component according to claim 1, wherein the scattering structures are deployed as optical antennas.

6. The optical component according to claim 1, wherein a geometry and size of the first and/or second scattering structures in an array differs by ≤5%.

7. The optical component according to claim 1, wherein the dimensions of the scattering structures are smaller than the wavelength λ of an incident electromagnetic radiation to be manipulated by the optical component.

8. The optical component according to claim 1, wherein the optical properties of the metasurface are switchable from a first optical property to a second optical property in less than 500 ms.

9. The optical component according to claim 1, wherein the optical properties of the metasurface are switchable from a first optical property to a second optical property in less than 50 ms.

10. The optical component according to claim 1, wherein a height of a volume between the first substrate and the top layer is at least 3× the height of the scattering structures, wherein a medium is arranged in this volume.

11. The optical component according to claim 10, wherein the medium is an ionic solution.

12. The optical component according to claim 1, wherein the first substance comprises a dielectric polymer or acrylate polymer.

13. The optical component according to claim 1, wherein the first substance at least partially encloses the first scattering structures.

14. The optical component according to claim 1, wherein the first and/or second scattering structures provide a geometry of a cylinder or a parallelepiped.

15. The optical component according to claim 1, wherein each unit cell comprises a line of first scattering structures and a line of the second scattering structures, wherein neighboring unit cells are arranged with respect to each other in such a way, that the first and second scattering structures are forming in alternating lines in the array.

16. The optical component according to claim 1, wherein the first substrate comprises a carrier, wherein the carrier comprises silica, quartz, a conductive coating, or combinations thereof.

17. The optical component according to claim 1, wherein each unit cell is addressable independently by the control signal.

18. An optical device comprising the optical component according to claim 1, wherein an application of an electric field causes a modulation of an optical functionality of the optical device due to a modulated phase profile of an incident electromagnetic radiation, which is transmitted through or reflected by the optical component.

19. The optical device according to claim 18, wherein the optical device is a holographic device or a lens or a beam steering device.

20. A method for producing an optical component comprising a planar metasurface, providing optical properties which are controllable by a control signal, said method comprising the steps of:
- providing a first substrate,
- providing a top layer,
- producing an array of scattering structures comprising a metal on a surface of the first substrate, and
- creating a repeating pattern of unit cells comprising at least two different scattering structures in the array, by application of a first substance comprising a dielectric material and having a first refractive index on at least a part of a surface of a first fraction of the scattering structures and application of a second substance comprising a polymer and having a second refractive index on at least a part of a surface of a second fraction of the scattering structures,
- wherein the second substance differs from the first substance and provides a variable refractive index depending on the control signal, wherein the real part n and/or the imaginary part K of the variable refractive index of the second substance is shiftable by the control signal to the respective value of the first substance.

* * * * *